May 19, 1942.  E. RICHTER  2,283,761
SEAT ADJUSTER
Filed Feb. 6, 1939
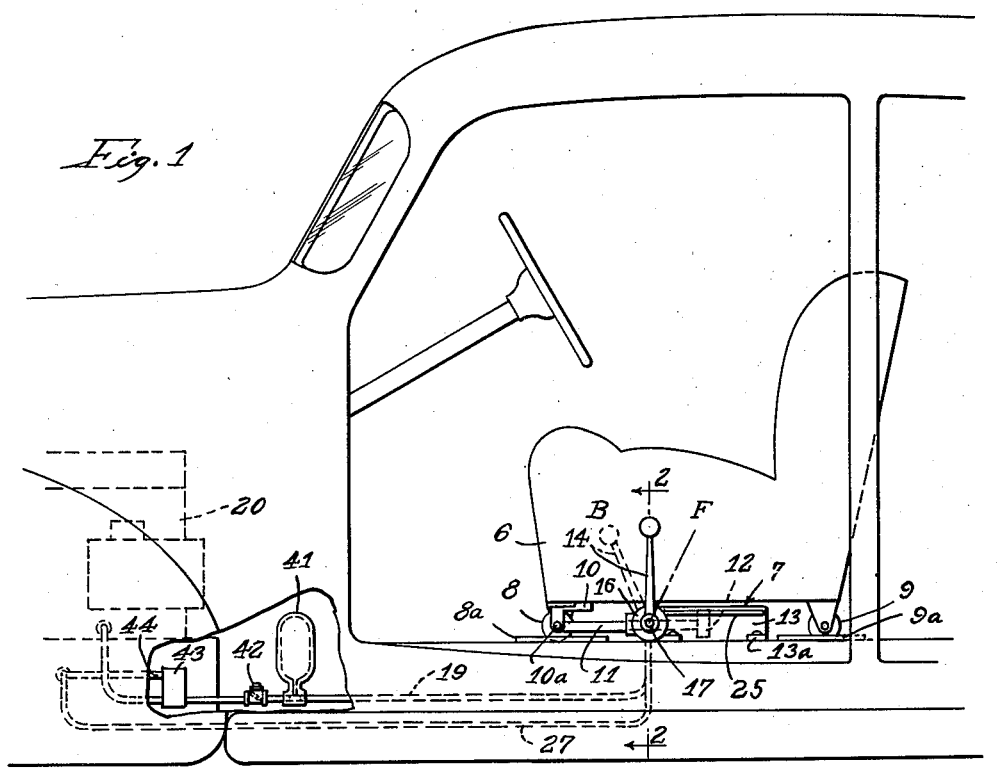
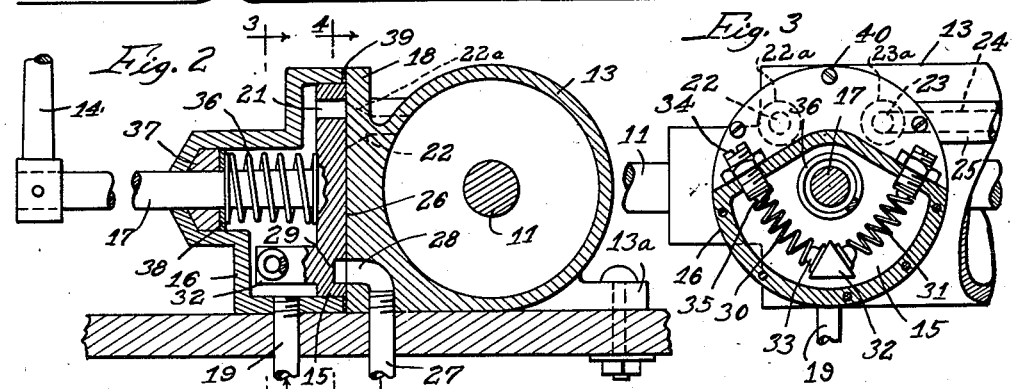 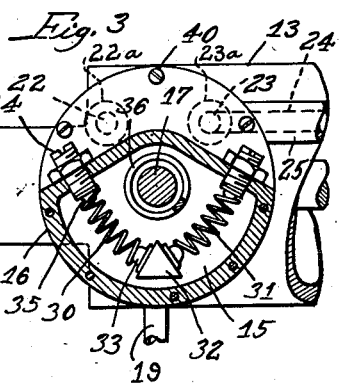
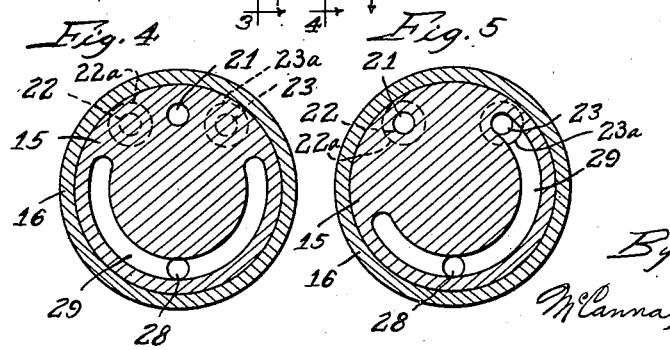
Inventor:
Edward Richter
By
McCanna, Wintercorn & Morsbach
Attys.

Patented May 19, 1942

2,283,761

UNITED STATES PATENT OFFICE 2,283,761

SEAT ADJUSTER

Edward Richter, Freeport, Ill., assignor of one-fourth to Earl L. Schofield, Freeport, Ill.

Application February 6, 1939, Serial No. 254,919

7 Claims. (Cl. 155—14)

This invention relates to seats for motor vehicles, and is particularly concerned with a new and improved adjuster for power-operated fore and aft adjustment of the driver's seat.

In the past there have been manually operable screw adjustments provided in connection with the driver's seat to permit setting the same in the desired relation to the steering wheel according to the preference of the driver, but such adjustments have been discarded because of their awkwardness and tediousness, and the fact that most women drivers found it too difficult, if not impossible to operate the same. The more recent designs of seat slides have eliminated screws and other adjusting means and provided merely means for locking the seat in adjusted position, thus leaving it to the driver to either adjust the seat before getting into the car, or adjust it as best he can when seated, as by lurching forward or shoving backward on the seat. In any event, most men found it difficult to make the adjustments, as some seat slides work too hard to permit unaided adjustment of the seat by the driver alone. It goes without saying that women drivers usually cannot adjust such seats. As a rule, therefore, where a man and wife drive the same car, either one or both will tolerate the wrong adjustment of the seat rather than bother making the difficult adjustments.

It is therefore the principal object of my invention to provide a seat adjuster which is operable by power by the mere movement of a control lever, but also permits manual adjustment of the seat in the old accustomed manner, that is, by applying thrust to the seat itself, when the power source is idle.

A salient feature of the seat adjuster of my invention is the provision of a piston and cylinder mechanism operable by means of oil from the oil pump of the engine, whereby to utilize an existing power source, accordingly simplifying the installation and making for all-around economy, besides greater dependability. The control lever actuates a rotary valve admitting oil under pressure to either end of the cylinder, while exhausting oil from the other end back to the sump, the valve being normally urged to a middle neutral position by spring means, sealing both ends of the cylinder so as to lock the seat in adjusted position.

Another salient feature of the invention is the provision of spring means tending normally to seat the rotary disk of the valve under light pressure so that it may be unseated by oil pressure from the cylinder when the seat is being manually adjusted, the disk being otherwise held seated firmly enough under oil pressure from the source to prevent accidental movement of the seat.

A special feature is the provision of an accumulator in the pressure line behind a check valve serving to trap a reserve supply of oil under pressure in the line to permit one or more adjustments of the seat when the engine is not running.

Still another feature is the provision in the pressure line of a relief valve for continuously by-passing oil to the return line when the seat is not being adjusted.

The invention is illustrated in the accompanying drawing, in which—

Figure 1 is a side view of part of an automobile body with the front door thereof removed and illustrating the seat equipped with a power-operable adjuster made in accordance with my invention;

Fig. 2 is a cross-section on the line 2—2 of Figure 1 on a larger scale;

Figs. 3 and 4 are sections on the corresponding numbered lines of Fig. 2, and

Fig. 5 is a section similar to Fig. 4 showing the valve rotor shifted to a position for forward adjustment of the seat.

The same reference numerals are applied to corresponding parts throughout the views.

The seat 6 may be mounted on any conventional seat slide structure with the adjuster 7 added as an accessory for power-operated adjustment of the seat, the only change in the conventional slides to make such a thing practical being the removal of the usual latch mechanism for locking the seat, inasmuch as the present seat adjuster is constructed so that it not only adjusts the seat, but locks it as well in adjusted position. It should be understood, therefore, that I do not limit my invention to the use of rollers 8 and 9 under the front and back portions of the seat. These rollers, together with the guide brackets 8a and 9a associated therewith, should be taken as mere diagrammatic representations of any suitable or preferred adjustable seat slide structure. A single adjuster is sufficient for the adjustment of most seats, and will be placed under the seat approximately at the middle where a bracket 10 projecting downwardly from the front portion of the seat, can be pivotally connected, as at 10a to the end of a piston rod 11 extending from a piston 12 working in the cylinder 13, fastened to the floor of the vehicle as at 13a. It is no problem to control the seat adjuster when so located, inasmuch as the control lever 14 disposed alongside the seat at the driver's end can be connected with the rotary disk 15 in the valve housing 16 by means of an elongated stem 17, the valve being preferably mounted directly on the side of the cylinder 13 on a support 18 so as to eliminate intermediate piping. The pipe 19 extending from the oil pump of the engine 20, communicates with the housing 16, and there is a port 21 in the rotor 15 arranged to be placed in communication with either one of two ports 22 and 23 communicating with opposite ends of the cylinder 13, whereby to deliver oil under pressure to either end of said cylinder to move the piston 12 in whichever direction is desired, and accordingly adjust the seat. A passage 24 is provided in the longitudinal boss 25 formed integral with the wall of the cylinder 13 to connect the port 23 with the remote rear end of the cylinder, the ports 22 and 23 terminating at the seat 26 formed on the valve support 18 at the front end of the cylinder. An oil return pipe 27 communicates with another port 28 in the valve seat 26 and serves to conduct oil from either end of the cylinder 13 back to the oil sump of the engine 20, and there is an arcuate groove 29 in the face of the valve rotor 15 communicating with the port 28 at all times and arranged to be placed selectively into communication with either of the ports 22 and 23.

In operation, the control lever 14 is normally in the mid or neutral position, and the rotor 15 is accordingly in the position shown in Fig. 4, and under these conditions the pressure port 21 does not communicate with either of the ports 22 and 23, and the same is true of the exhaust groove 29. The seat 6 is accordingly locked in adjusted position since the ports 22 and 23 communicating with opposite ends of the cylinder 13 are sealed. However, when the rotor is turned through approximately 30° in either direction from the neutral position, as for example, to the position B or F shown in Fig. 1, the seat is arranged to be adjusted backward or forward, as desired. In position B illustrated in Fig. 5, the oil is delivered to the front end of the cylinder through port 22 to move the piston 12 to the rear and accordingly adjust the seat 6 in that direction, oil being discharged from the rear end of the cylinder through the passage 24 and port 23 into the groove 29 and thence through port 28 and pipe 27 back to the sump of the oil pump of the engine 20. In position F, the reverse is true; the pressure port 21 is then in communication with the port 23, while the exhaust groove 29 is in communication with the port 22 so that oil under pressure is delivered to the rear end of the cylinder 13 to cause forward movement of the piston 12 for forward adjustment of the seat, and oil is discharged from the front end of the cylinder through the port 22 and conducted back to the sump of the engine oil pump. The cylinder 13 will be of sufficient size in relation to the capacity of the engine oil pump so that the seat 6 will not move forward or backward too rapidly, but in any event the operator can control the rate of movement by opening the valve more or less and accordingly regulating the influx of oil to the cylinder. The moment the seat is brought to the desired position the lever 14 is released and will return to the neutral mid position under the action of one of the coiled compression springs 30 and 31 provided in the valve housing 16 on opposite sides of the projection 32 on the back of the valve rotor 15. Prongs 33 on opposite sides of the projection serve to hold the ends of the springs in proper engagement with the projection 32, and screws 34 in the walls of the housing 16 have reduced ends 35 engaging in the other ends of the springs to hold the same in place, while at the same time permitting adjustment of the spring pressure in the event it is found that one of the springs is slightly weaker than the other, and the valve rotor 15 accordingly does not center itself at a mid position.

With the construction shown, the seat 6 may be tilted forwardly on the rollers 8 as an axis without interfering with the seat adjuster, as for example, in the case of a two-door sedan where access to the rear seat may require tilting the driver's seat forward.

The valve rotor 15, as shown in Fig. 2, when not held seated under oil pressure from pipe 19 is held seated under light pressure of a coiled compression spring 36. This serves also to hold a packing gland 37 seated in the stuffing box 38 through which the stem 17 extends, whereby to minimize danger of oil leakage from the housing 16. A gasket will also be provided at 39 between the housing 16 and the valve support 18 to prevent leakage when the housing is fastened in place, as by screws 40. The light spring pressure on the rotor 15 is easily overcome by oil pressure from within the cylinder 13 to unseat the rotor 15 when the engine 20 is not running and the oil pump is idle. In that way the driver when he gets into the car can, before starting the engine, move the seat in either direction manually by pressure rearwardly against the back of the seat or pulling forwardly on the seat in the old accustomed manner. Then, when the engine is started, oil pressure on the rotor 15 will prevent any further movement of the seat except by power in the manner described. To insure easier unseating of the rotor 15 during manual adjustment of the seat, I may enlarge the ports 22 and 23 or merely flare the outer ends thereof as indicated at 22a and 23a, whereby to expose a larger area of the face of the rotor to the oil pressure created in the cylinder 13 by the manual force exerted on the seat and accordingly overcome the seating pressure of spring 36 with less effort.

An accumulator is indicated at 41 and may or may not be provided connected in the pressure line 19 behind a check valve 42 in which a certain amount of oil can be stored under pressure by compression of air in the top of the accumulator chamber, whereby when the engine is not running, the driver nevertheless can adjust the seat by power to a certain extent. The accumulator also makes for smoother operation of the seat adjuster by absorbing whatever pulsations there may be in the delivery of oil to the cylinder from the engine oil pump.

At 43 there is indicated a pressure relief valve in the line 19 in front of the check valve 42, which has a pipe 44 communicating therewith for by-passing oil directly back to the sump of the oil pump when the seat adjuster is not being used. This valve, it should be understood, maintains a predetermined pressure in the line 19 so long as the engine 20 is running, the valve being arranged to open automatically above such pressure so as to relieve the pump of excessive back pressures while assuring that there will be sufficient oil pressure available at all times for power adjustment of the seat.

It is believed the foregoing description conveys a good understanding of the objects and advantages of my invention. The appended claims have been drawn with a view to covering all legitimate modifications and adaptations.

I claim:

1. An adjustable seat comprising, in combination, with a horizontally movable seat and a support therefor, interfitting piston and cylinder elements one of which is mounted on the support and the other of which has connection with the seat whereby relative movement between the piston and cylinder elements causes an adjusting movement of the seat, and means whereby said seat is arranged to be adjusted by fluid pressure admitted to the cylinder or by manual push or pull on the seat in the direction of adjustment desired, said means comprising a source of pressure fluid supply, and a manually operable valve to control communication between the fluid pressure source and the cylinder, said valve being movable to a position to conduct fluid under pressure selectively to either end of the cylinder and simultaneously conduct fluid from the respectively opposite end of the cylinder back to the source to cause an adjusting movement of the seat under fluid pressure, said valve being movable to a second position cutting off communication between the source of fluid pressure and the cylinder whereby to lock the seat in an adjusted position, said valve being movable to another position establishing free communication between the opposite ends of the cylinder during movement of the seat manually independently of the fluid pressure source in either direction.

2. An adjustable seat comprising, in combination, with a movable seat and a support therefor, interfitting piston and cylinder elements one of which is mounted on the support and the other of which has connection with the seat whereby relative movement between the piston and cylinder elements causes an adjusting movement of the seat, a source of pressure fluid supply, and a manually operable disk valve for controlling communication between the source of pressure fluid supply and said cylinder to admit fluid selectively to either end of the cylinder to adjust the seat in either direction as desired, the manually operable disk valve comprising a ported disk, a ported stator, the ports of which communicate with opposite ends of the cylinder and are adapted to communicate with inlet and exhaust ports provided in the disk, a casing on the stator enclosing said disk, and spring means tending normally to hold the disk seated under yielding pressure, said disk being unseatable by fluid pressure from within the cylinder in response to manual adjustment of the seat independently of the fluid pressure source.

3. An adjustable seat comprising, in combination, with a movable seat and a support therefor, interfitting piston and cylinder elements one of which is mounted on the support and the other of which has connection with the seat whereby relative movement between the piston and cylinder elements causes an adjusting movement of the seat, a source of pressure fluid supply, and a manually operable disk valve for controlling communication between the source of pressure fluid supply and said cylinder to admit fluid selectively to either end of the cylinder to adjust the seat in either direction as desired, the manually operable disk valve comprising a ported disk, a ported stator, the ports of which communicate with opposite ends of the cylinder and are adapted to communicate with inlet and exhaust ports provided in the disk, a casing on the stator enclosing said disk, and spring means tending normally to hold the disk seated under yielding pressure, said disk being unseatable by fluid pressure from within the cylinder in response to manual adjustment of the seat independently of the fluid pressure source, the ports in the stator being enlarged in relation to the ports in the disk whereby to facilitate overcoming the pressure of the spring means.

4. An adjustable seat comprising, in combination, with a movable seat and a support therefor, interfitting piston and cylinder elements one of which is mounted on the support and the other of which has connection with the seat whereby relative movement between the piston and cylinder elements causes an adjusting movement of the seat, a source of pressure fluid supply, and a manually operable disk valve for controlling communication between the source of pressure fluid supply and said cylinder to admit fluid selectively to either end of the cylinder to adjust the seat in either direction as desired, the manually operable disk valve comprising a ported disk, a ported stator, the ports of which communicate with opposite ends of the cylinder and are adapted to communicate with inlet and exhaust ports provided in the disk, a casing on the stator enclosing said disk, the inlet port in said disk extending therethrough for communication with the inside of the casing, the fluid pressure source having communication with said casing whereby when said source is operating fluid pressure therefrom serves to hold the disk seated to prevent unseating thereof by fluid pressure from within the cylinder, and spring means in said casing for holding said disk seated under lighter pressure whereby said disk is unseatable under fluid pressure from within the cylinder in manual adjustment of the seat independently of the fluid pressure source when the fluid pressure source is not in operation.

5. An adjustable seat comprising, in combination, with a movable seat and a support therefor, interfitting piston and cylinder elements one of which is mounted on the support and the other of which has connection with the seat whereby relative movement between the piston and cylinder elements causes an adjusting movement of the seat, a source of pressure fluid supply, and a manually operable disk valve for controlling communication between the source of pressure fluid supply and said cylinder to admit fluid selectively to either end of the cylinder to adjust the seat in either direction as desired, the manually operable disk valve comprising a ported disk, a ported stator, the ports of which communicate with opposite ends of the cylinder and are adapted to communicate with inlet and exhaust ports provided in the disk, a casing on the stator enclosing said disk, the inlet port in said disk extending therethrough for communication with the inside of the casing, the fluid pressure source having communication with said casing whereby when said source is operating fluid pressure therefrom serves to hold the disk seated to prevent unseating thereof by fluid pressure from within the cylinder, and spring means in said casing for holding said disk seated under lighter pressure whereby said disk is unseatable under fluid pressure from within the cylinder in manual adjustment of the seat independently of the fluid pressure source when the fluid pressure source is not in operation, the ports in the stator being enlarged in relation to the ports in the disk whereby to facilitate overcoming the pressure of the spring means.

6. An adjustable seat comprising, in combination, with a movable seat and a support therefor, interfitting piston and cylinder elements one of which is mounted on the support and the other of which has connection with the seat whereby relative movement between the piston and cylinder elements causes an adjusting movement of the seat, and means whereby said seat is arranged to be adjusted by fluid pressure admitted to the cylinder or by manual push or pull on the seat in the direction of adjustment desired, said means comprising a source of pressure fluid supply and a manually rotatable plate type valve to control communication between the fluid pressure source and the cylinder to conduct fluid under pressure selectively to either end of the cylinder and simultaneously conduct fluid from the respectively opposite end of the cylinder back to the source to cause an adjusting movement of the seat under fluid pressure, said valve comprising a plate, spring means normally tending to move the plate in one direction to seated position, and means for manually turning the plate on the seat to control the fluid flow between the cylinder and source for fluid pressure operation of the seat from one position to another, said plate being unseatable against the action of said spring means under fluid pressure from within the cylinder when the seat is moved manually whereby to provide open communication between the opposite ends of the cylinder independently of said plate.

7. An adjustable seat as set forth in claim 6, wherein said manually rotatable plate type valve is furthermore held seated under fluid pressure from the source of pressure fluid supply to aid the spring means in resisting unseating of the plate valve under fluid pressure from within the cylinder.

EDWARD RICHTER.